(12) United States Patent
Luaces

(10) Patent No.: US 7,512,113 B2
(45) Date of Patent: Mar. 31, 2009

(54) METHOD AND SYSTEM FOR DETERMINING A MINIMUM TIME OF FLIGHT OF A RADIO FREQUENCY TRANSMISSION

(75) Inventor: Eduardo Lorenzo Luaces, Lake Mary, FL (US)

(73) Assignee: Motorola, Inc., Schaumburg, IL (US)

( * ) Notice: Subject to any disclaimer, the term of this patent is extended or adjusted under 35 U.S.C. 154(b) by 436 days.

(21) Appl. No.: 11/314,218

(22) Filed: Dec. 21, 2005

(65) Prior Publication Data

US 2007/0140211 A1 Jun. 21, 2007

(51) Int. Cl.
*H04J 3/06* (2006.01)
(52) U.S. Cl. ...................... 370/350; 455/403
(58) Field of Classification Search .................. None
See application file for complete search history.

(56) References Cited

U.S. PATENT DOCUMENTS

| 5,715,240 | A  | * | 2/1998 | Borras et al. ............... 370/252 |
| 6,760,592 | B2 |   | 7/2004 | Hernandez et al. |
| 2002/0118723 | A1 |   | 8/2002 | McCrady et al. |
| 2003/0058833 | A1 |   | 3/2003 | Hashem et al. |
| 2003/0143975 | A1 | * | 7/2003 | Hernandez et al. .......... 455/404 |
| 2004/0114551 | A1 | * | 6/2004 | Gavillero et al. ............ 370/324 |

* cited by examiner

*Primary Examiner*—Lester Kincaid
*Assistant Examiner*—Phuoc Doan
(74) *Attorney, Agent, or Firm*—Randi L. Karpinia

(57) ABSTRACT

A method and system for determining a minimum time of flight between communication devices is useful for correcting ranging errors induced by multi-path signals. The method includes transmitting a range request message, including a first periodically repeating synchronization sequence, from the first communication device via a first RF channel to the second communication device (step 91). A range response message, including a second periodically repeating synchronization sequence and a minimum path turn around time, is then received at the first communication device via a second RF channel from the second communication device (step 92). A change in the second RF channel is induced after receipt of each synchronization sequence. A minimum path round trip time is then determined from multiple time of arrival determinations (step 93). Finally, the minimum time of flight is calculated from the minimum path round trip time and the minimum path turn around time (step 94).

25 Claims, 10 Drawing Sheets

METHOD AND SYSTEM FOR DETERMINING A MINIMUM TIME OF FLIGHT OF A RADIO FREQUENCY TRANSMISSION

FIELD OF THE INVENTION

The present invention relates generally to geographic positioning using wireless communication devices, and in particular to a method and system for detecting a direct path signal in a signal that includes multi-path signals.

BACKGROUND

A rapid and accurate determination of the position of a person carrying a wireless mobile communication device is often useful. For example, emergency services personnel can operate more effectively and more safely if their position can be accurately determined in hazardous environments, such as within a burning building. Various prior art methods thus exist for determining the position of mobile nodes in wireless communication networks.

According to one prior art method, round trip timing is used to calculate distance. A master or ranger radio transmits a signal, such as an RTS (ready to send) signal, which is received by a target or pinger radio. The pinger radio transmits a response signal, such as a CTS (clear to send) signal, at some time after receiving the RTS signal. The CTS signal is then received at the ranger radio some time later. The time between transmitting the RTS signal and receiving the CTS signal is measured by the ranger radio, using an internal clock, as a round trip time $T_{RTT}$. The time between receipt of the RTS signal and transmission of the CTS signal is measured by the pinger radio, using an internal clock, as a turn around time, $T_{TAT}$. The time of flight, $T_{TOF}$, between the ranger radio and the pinger radio then can be calculated by subtracting $T_{TAT}$ from $T_{RTT}$ and dividing by two.

Geographical positioning of a mobile node can be achieved by having the mobile node perform the above time-of-flight ranging transaction with three or more geographically fixed nodes (or at least nodes which can report their geographic location at any given time). The location of the mobile node is then calculated using the fact that electromagnetic wave transmissions travel at the speed of light, thus allowing range determinations, and further using known triangulation techniques.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
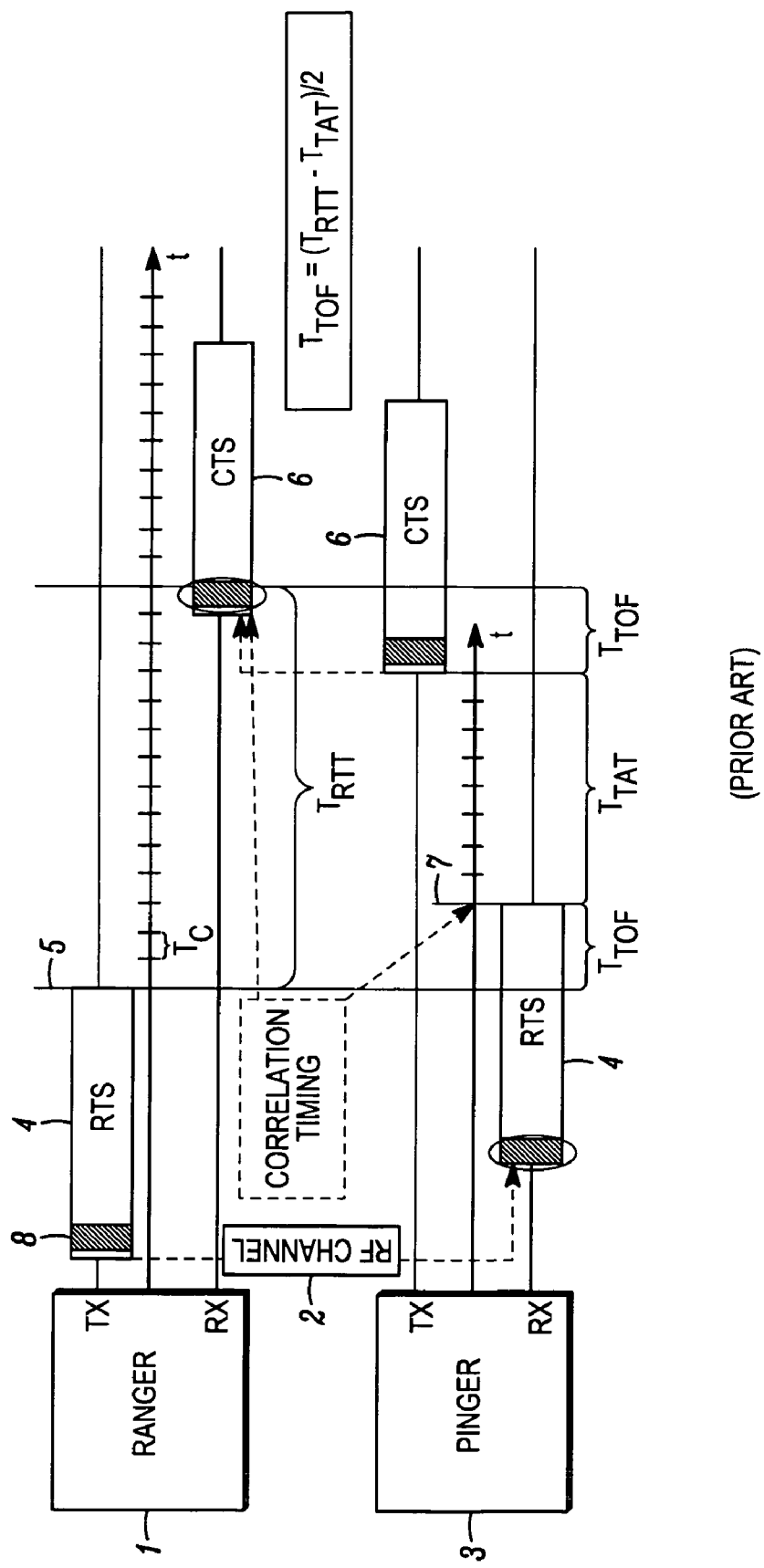
FIG. 1 is a timing diagram illustrating a ranging transaction in a network of communication nodes according to the prior art.

Before describing in detail embodiments that are in accordance with the present invention, it should be observed that the embodiments reside primarily in combinations of method steps and apparatus components related to determining a minimum time of flight of a radio frequency transmission. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of determining a minimum time of flight of a radio frequency transmission described herein. The non-processor circuits may include, but are not limited to, a radio receiver, a radio transmitter, signal drivers, clock circuits, power source circuits, and user input devices. As such, these functions may be interpreted as steps of a method for determining a minimum time of flight of a radio frequency (RF)

transmission. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, a timing diagram illustrates a ranging transaction in a network of communication nodes according to the prior art. A ranger 1 determines a distances between itself and a neighboring pinger node 3 by initiating and timing a time of flight (TOF) ranging transaction. The transaction starts when the ranger 1 transmits a request-to-send (RTS) message 4 via an RF channel 2 to the pinger node 3, and also requests a range reply. At precisely an end 5 of the RTS transmission 4, the ranger 1 starts a timer to measure the round-trip time (RTT) of the impending transaction. The timer calculates the RTT as an integer multiple of correlation timing steps $T_c$. Meanwhile, the pinger 3 receives the RTS message 4 with a range request and schedules a clear-to-send (CTS) message 6 back to the ranger 1 at a known turn-around time (TAT) after an end 7 of the RTS reception. Finally, the ranger 1 receives the CTS message 6 and stops the RTT timer. The value in the RTT timer is the composite transaction time, which includes the TOF through the RF channel 2 for each of the two transmissions (i.e., the request from ranger 1 to pinger 3 and the reply from pinger 3 to ranger 1), and the constant TAT. Obtaining the one-way TOF is simply a matter of removing the TAT and dividing the result by two, as shown below in Equation 1:

$$T_{TOF} = \frac{1}{2}(T_{RTT} - T_{TAT}). \quad \text{Eq. 1}$$

$T_{TOF}$ is converted into distance by multiplying the one-way $T_{TOF}$ value by the speed-of-light, which is the propagation velocity of the radio frequency signal. The above process is then repeated with a plurality of different pinger nodes at known locations, and the position of the ranger node then can be determined using known triangulation processes.

A correlation at each node 1, 3 establishes the time-of-arrival (TOA) of the RTS/CTS messages 4, 6. The RTS/CTS messages 4, 6 are formatted with a known direct-sequence-spread-spectrum (DSSS) modulated signal synchronization sequence 8 at the beginning of each message burst so that a receiver can synchronize to the start of a data frame.

Figure 2:
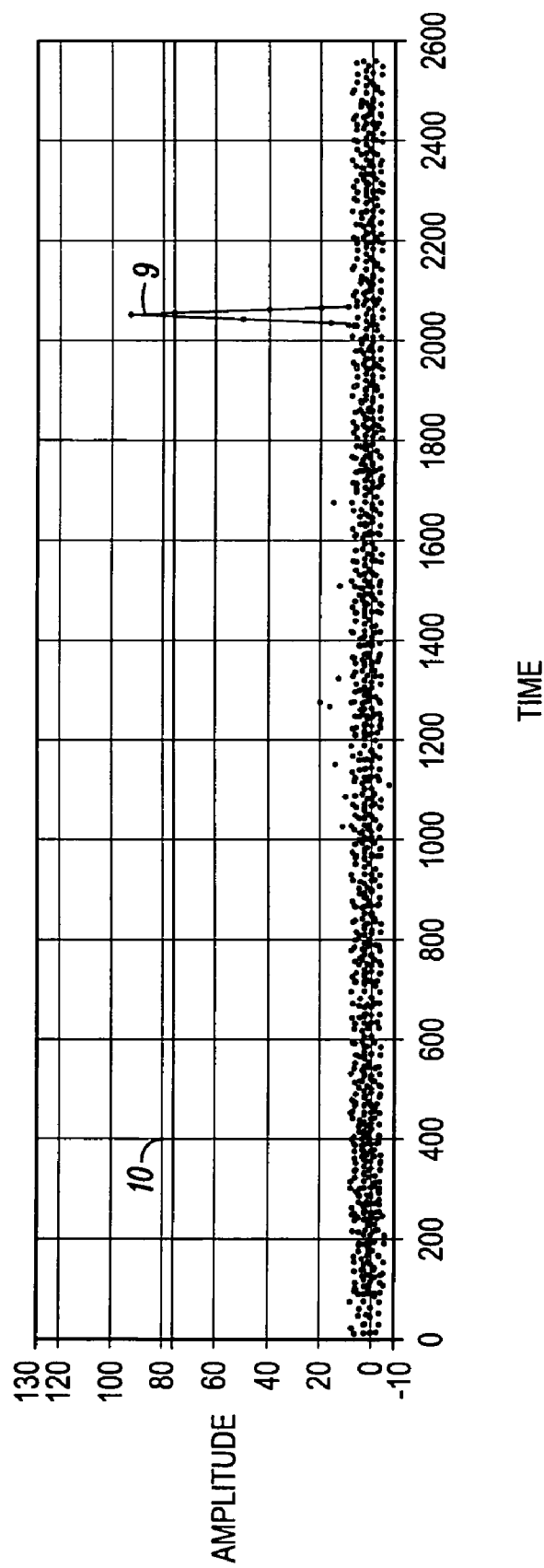
FIG. 2 is a plot of amplitude versus time illustrating a direct-sequence-spread-spectrum (DSSS) matched-filter correlator output showing a well-defined output peak, according to the prior art.

Referring to FIG. 2, a plot of amplitude versus time illustrates a direct-sequence-spread-spectrum (DSSS) matched-filter correlator output, according to the prior art. The output of the correlator is mostly random until a "match" is made indicating that a valid synchronization sequence has been detected. As shown, a receiver detects arrival of a message 4, 6 when the correlator generates a well-defined output peak 9 that exceeds a threshold value 10.

Preferably, the precision of a TOA timing event is a function of the output sample rate of the correlator, which is optimally based upon the DSSS chip-rate of the transmission; hence the smaller the chip-rate of the system, the more precise the TOF measurement. Also, since the ranger 1 and pinger 3 have independent, non-synchronized time bases, the precision of a TOA timing event can be degraded due to asymmetry of a correlation peak.

Thus, chip-rate quantization and time based synchronization are systematic sources of TOA timing precision degradation. However, a larger non-systematic error source exists due to multiple possible transmission paths from the ranger 1 to the pinger 3.

Figure 3:
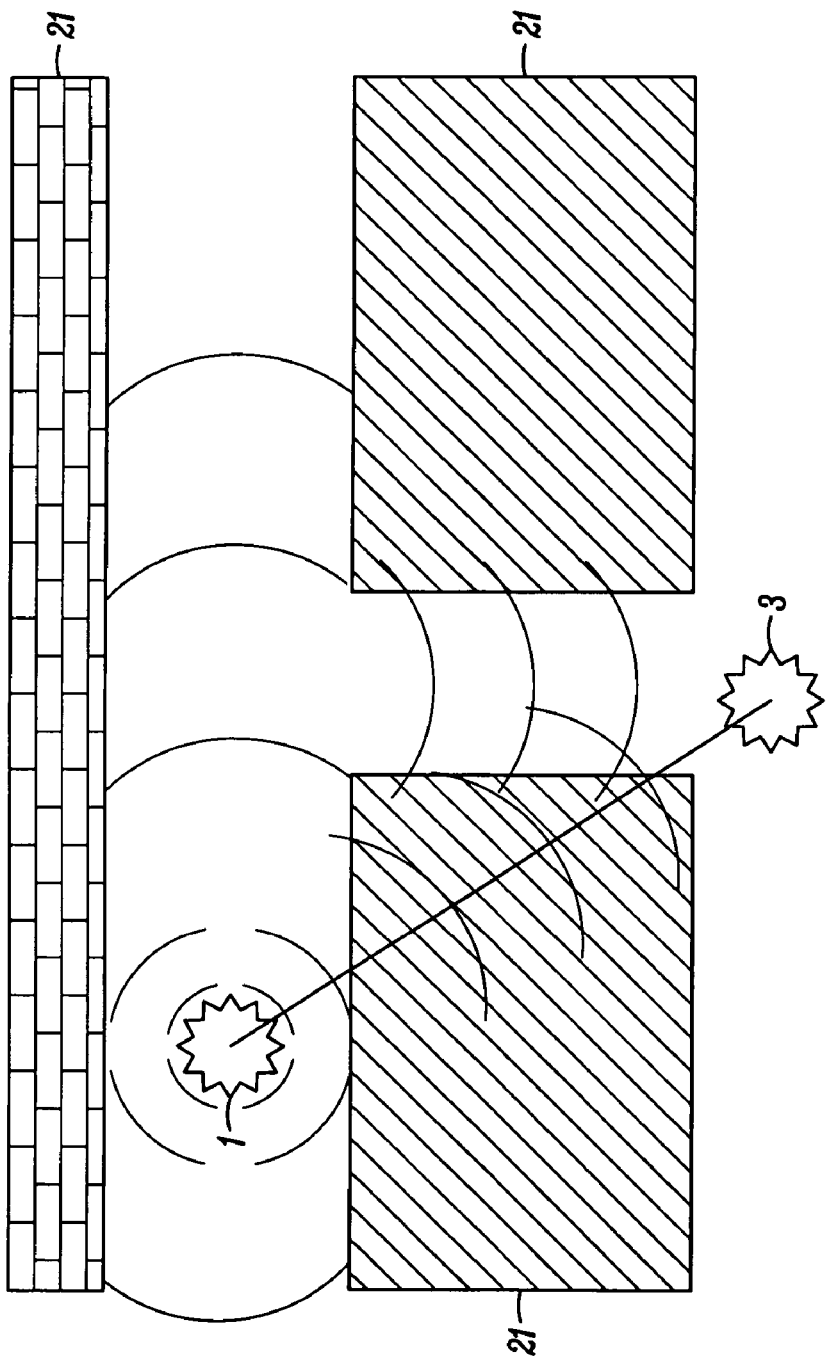
FIG. 3 is a schematic diagram illustrating multiple transmission paths between a ranger and a pinger, as known in the prior art.

Referring to FIG. 3, a schematic diagram illustrates multiple transmission paths between the ranger 1 and the pinger 3, as known in the prior art. In general, electromagnetic waves propagate through, as well as reflect off of, various types of surfaces. When a transmission occurs via an omni directional antenna, the electromagnetic wave propagates in all directions. It will be appreciated by those of ordinary skill in the art that most indoor/outdoor electromagnetic environments contain one or more reflecting objects 21 between transmitting and receiving antennas, such as the ranger 1 and the pinger 3. The objects 21 scatter electromagnetic transmissions and result in multi-path copies of data packets being received at the pinger 3, each copy having followed a different transmission path.

Figure 4:
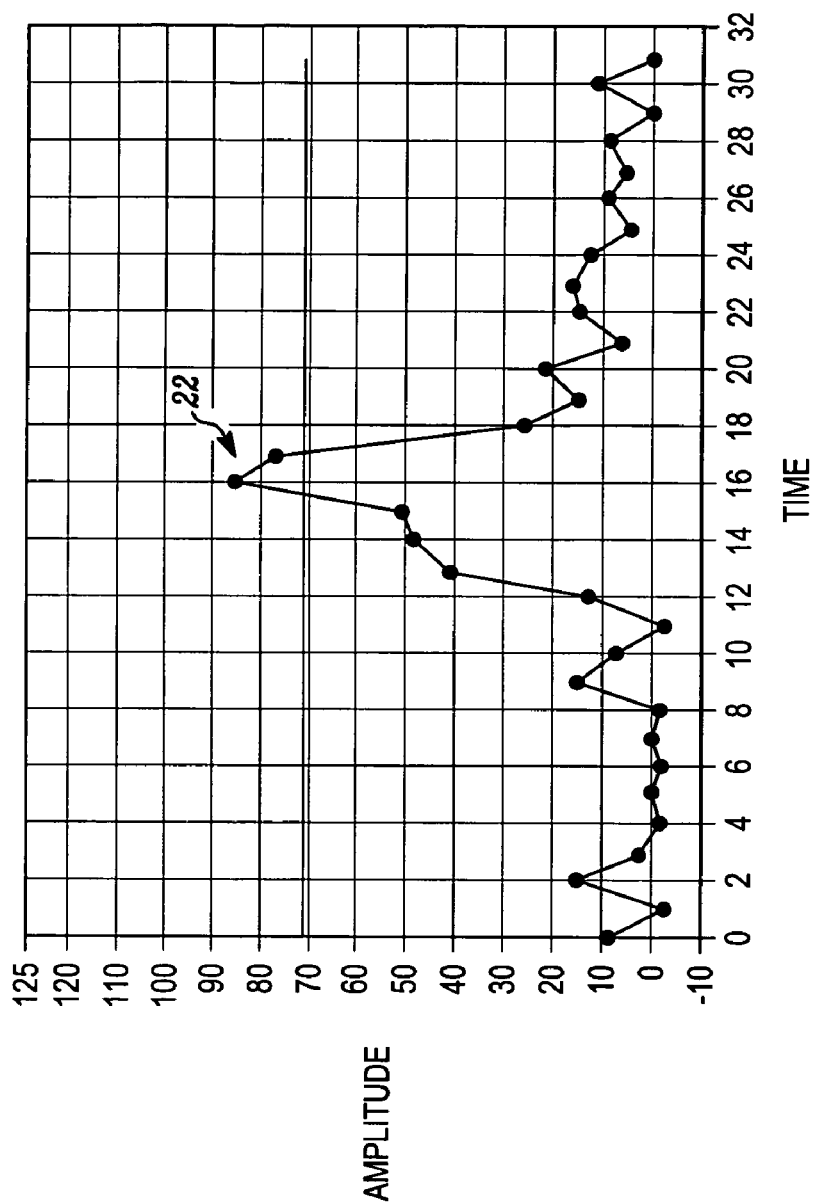
FIG. 4 is a plot of amplitude versus time illustrating a direct-sequence spread-spectrum (DSSS) matched-filter correlator output showing a poorly-defined output peak caused by multi-path signals, according to the prior art.

Referring to FIG. 4, a plot of amplitude versus time illustrates a DSSS matched-filter correlator output showing a poorly-defined output peak 22 caused by multi-path signals, according to the prior art. In a multi-path environment, scattered electromagnetic transmissions are received at the pinger 3. The transmissions have differing amplitudes and are time-shifted from one another, but are processed as one signal. The net effect is that the DSSS correlation peak 22 may be poorly defined. Such a flat correlation signature can dilute the precision of TOA determinations. In certain harsh electromagnetic environments, a direct-path electromagnetic wave reaches a receiver at a much weaker level than other delayed reflected waves, effectively masking the direct path TOA and erroneously increasing the net TOF measurement. Thus the ranging distance is also erroneously increased by a factor that is a multiple n of correlation timing steps (e.g., n $T_c$).

Figure 5:
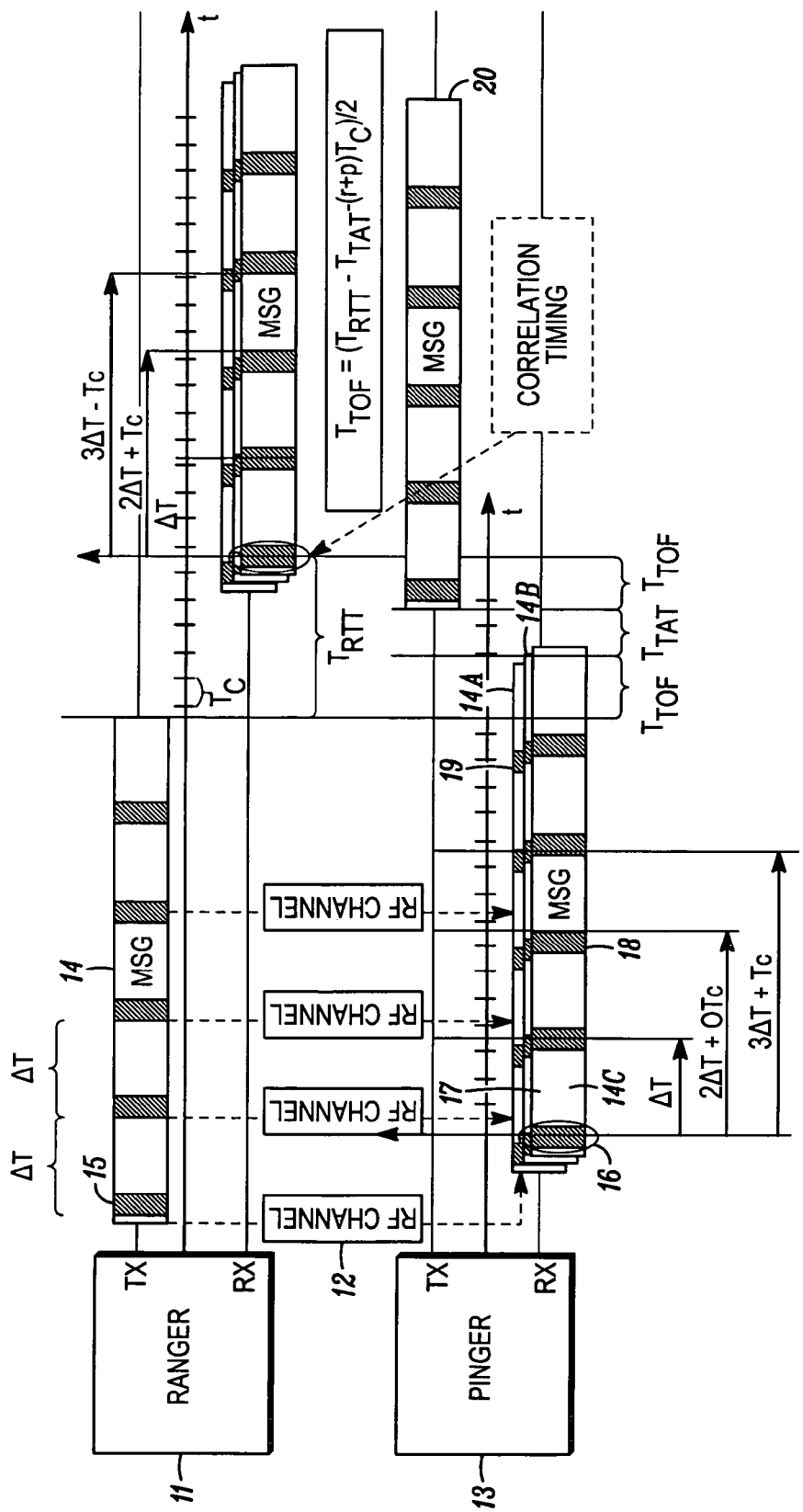
FIG. 5 is a timing sequence diagram illustrating a method for determining a minimum time of flight of a radio frequency transmission, according to an embodiment of the present invention.

Referring to FIG. 5, a timing sequence diagram illustrates a method for determining a minimum time of flight of an RF (radio frequency) transmission, according to an embodiment of the present invention. As illustrated, a ranger 11 initiates a ranging transaction by transmitting a range request message 14 via a channel 12 to a pinger 13, and indicates that a range reply is required. The message 14 includes a known synchronization sequence 15 so that a receiver can synchronize the message 14 to the start of a frame. For example, the synchronization sequence 15 can be a DSSS synchronization sequence as described above. As shown, the synchronization sequence 15 is repeated with a period of ΔT. The synchronization sequence 15 is shown in FIG. 5 as repeating throughout the message 14; however, according to alternative embodiments of the present invention a fixed number of repetitions of the sequence 15 per message 14 also can be used.

Due to the multi-path phenomenon described above, three copies 14a, 14b, 14c of the message 14 are shown overlapping in FIG. 5 as received at the pinger 13. Message 14a travels a direct path from the ranger 11 and is thus shown as received at the pinger 13 first. Message 14b travels an indirect path and thus arrives second, while message 14c travels a further indirect path and arrives at the pinger 13 last. For purposes of illustration, assume here that the direct message 14a is relatively weak compared to the indirect messages 14b, 14c, so that message 14b represents a first detected message having a detected synchronization sequence 16.

Based on the detected synchronization sequence 16, message 14b also has an expected subsequent synchronization sequence 17 spaced by ΔT. The timing ΔT is marked from the end of the synchronization sequence 16 to the end of the synchronization sequence 17. It will be appreciated by those of ordinary skill in the art that if a correlation peak of a synchronization sequence 18 is detected later than expected—i.e., later than an integer multiple of the known fixed synchronization peak interval ΔT (here, pTc later than the expected 2ΔT)—then the first synchronization sequence 16 most likely propagated through an RF channel that was a more direct path than the subsequent synchronization sequence 18. Thus, here the synchronization sequence 18 is shown as part of message 14c. Similarly, if a synchronization sequence 19 is detected earlier than expected—i.e., earlier than the known fixed synchronization peak interval ΔT (here, pTc earlier than the expected 3ΔT)—then the first synchronization sequence 16 most likely propagated through an RF channel that was a less direct path than the earlier synchronization sequence 19.

A number of synchronization sequences are contained in each message 14, thus allowing multiple values of a correction factor (p) to be determined. The largest value of p represents the shortest, and therefore most direct, path detected. According to various embodiments of the present invention, the value p can be used either to shorten the turn around time (TAT) at the pinger 13, or the value of p can be transmitted back to the ranger 11.

For example, after receiving the message 14, the pinger 13 sends a range response message 20 to the ranger 11 and the ranger performs a similar TOA timing correction algorithm across multiple, periodically-embedded synchronization sequences from various multi-path signals. A parameter r is then determined as the detected error in the ranger synchronization peak timing, and is used as a correction factor to correct the measured round trip time to a minimum round trip time. The time of flight value is then determined by either of the following equations:

$$T_{TOF}=\tfrac{1}{2}[(T_{RTT}-rT_C)-(T_{TAT}-pTc)], \qquad \text{Eq. 2}$$

where the correction to $T_{TAT}$ is made at the pinger 13 and the correction to $T_{RTT}$ is made at the ranger 11; or $$T_{TOF}=\tfrac{1}{2}[(T_{RTT}-T_{TAT}-(r+p)Tc)], \qquad \text{Eq. 3}$$

where the correction factor p is transmitted from the pinger 13 to the ranger 11 and a total correction is made at the ranger 11, or for example at a central monitoring station.

Due to the fairly static nature of the electromagnetic environment during the time of a transmission of each message 14, 20, according to an embodiment of the present invention the reception characteristics of a receiver's antenna are induced to change prior to the occurrence of every synchronization sequence. In the description herein such a change in reception characteristics is referred to as an "induced RF channel change". It will be appreciated by those of ordinary skill in the art that such change can be accomplished in various ways such as by using beam steering techniques or antenna switching. The net effect of inducing a change in an RF channel is that the electromagnetic environment is changed and hence the probability of the direct path, rather than some other path, creating a strong synchronization peak is enhanced.

Figure 6:
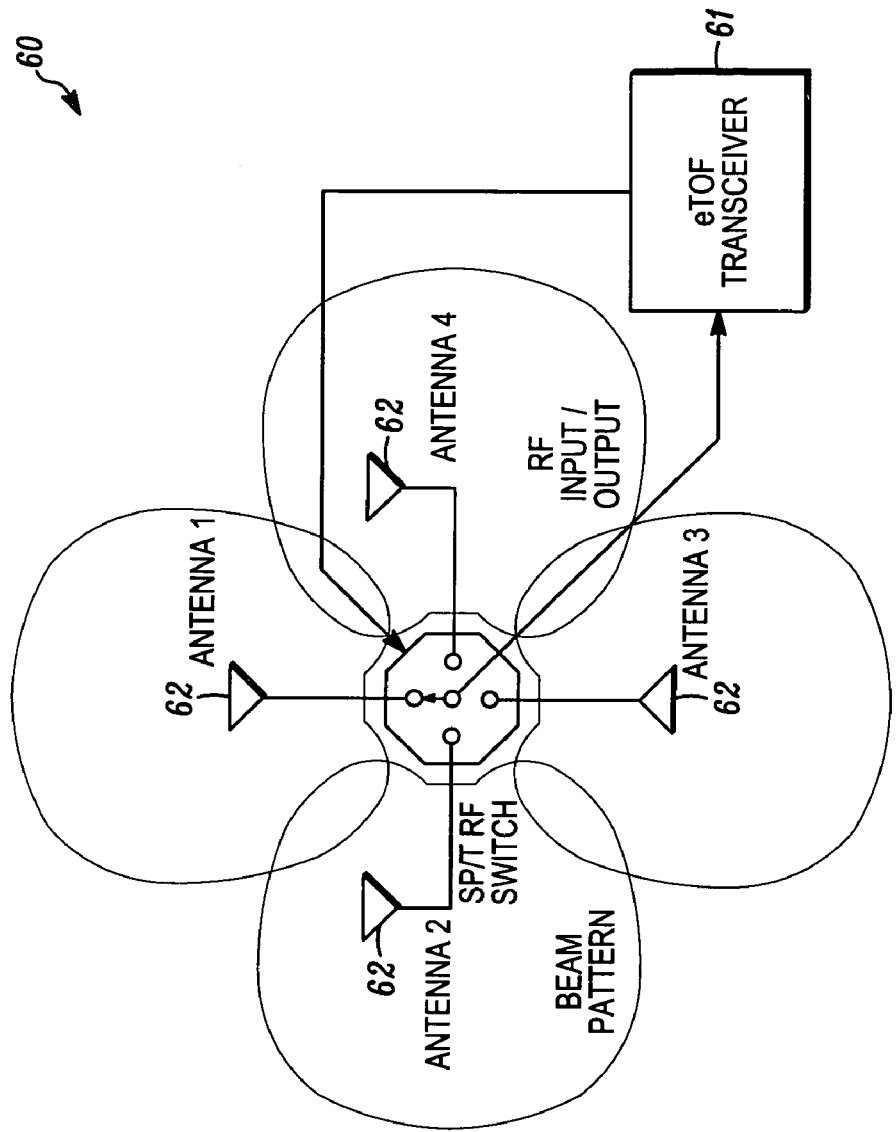
FIG. 6 is a schematic diagram illustrating a passive switched antenna system, according to the prior art.

Referring to FIG. 6, a schematic diagram illustrates a passive switched antenna system 60, according to the prior art. It will be appreciated by those of ordinary skill in the art that the antenna switching is a passive scheme that employs a single position n-throw (SPnT) RF switch at the input of a transceiver 61 to multiplex distinct antennas 62. The number of antennas, spacing, and beam patterns are chosen such that the system's composite electromagnetic response is configured to have deep nulls in distinct angular directions. The configuration in FIG. 6 employs four directional antennas 62 diametrically opposed and multiplexed via a SP4T RF switch. An embodiment of the present invention modulates the composite electromagnetic response by switching between the antennas 62. Because each antenna 62 has a directional beam pattern, the composite electromagnetic response has a deep null that can be placed in any of four different directions.

Figure 7:
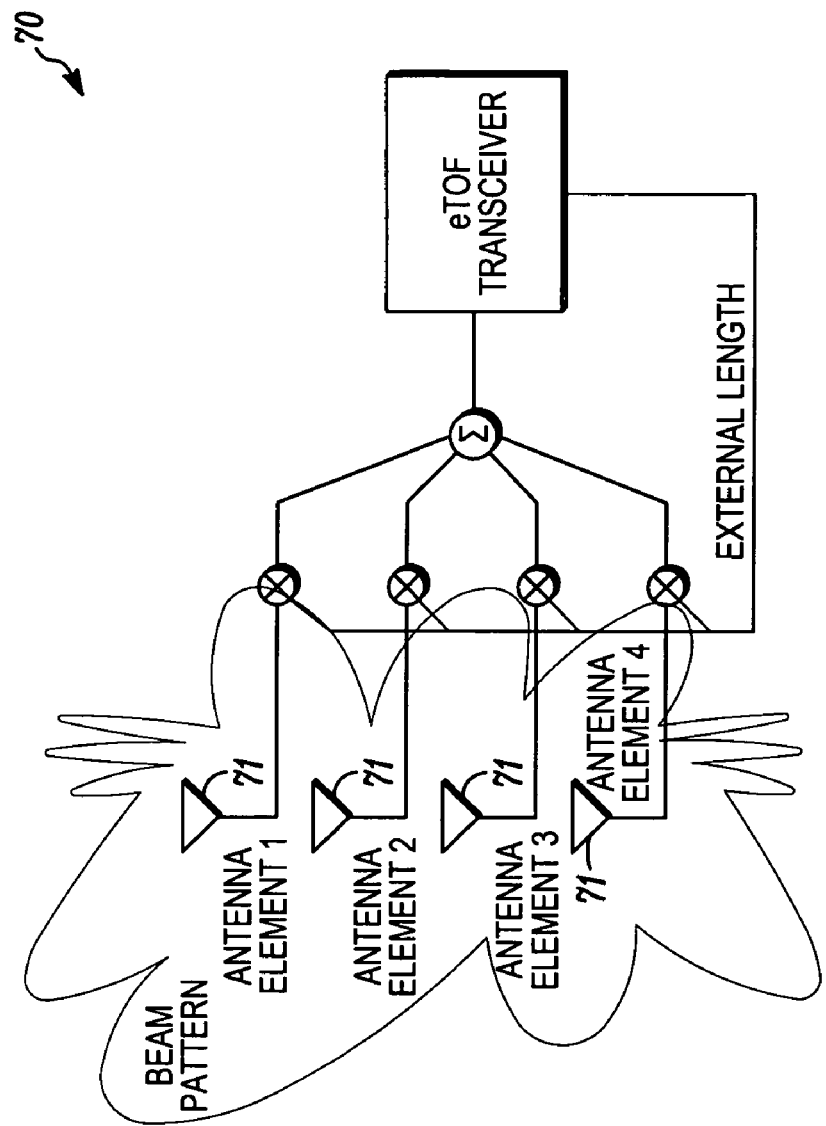
FIG. 7 is a schematic diagram illustrating a beam-steered antenna system, according to the prior art.

Referring to FIG. 7, a schematic diagram illustrates a beam-steered antenna system 70, according to the prior art. Antenna beam steering is an active scheme that uses multiple omni directional antenna elements 71, whose signals are summed to form a composite electromagnetic response. The response of this type of an antenna system 70 is determined by the geometric placement of the individual elements 71 and by changing the relative phase and amplitude of the antenna element signals prior to the summation operation. Typically, phase shifting is done using complex active RF mixer circuit elements controlled via analog constants called weights. The element weights are dynamically chosen such that the beam pattern of the system 70 has a directional characteristic in one angular direction. An embodiment of the present invention periodically changes the antenna element weights to modulate the direction of the composite electronic response of the system 70.

The antenna designs of FIG. 6 and FIG. 7 are two possible approaches for inducing a change in the RF channel between each synchronization sequence of the present invention. Persons skilled in the art are readily able to use either of these approaches, or indeed other approaches, for changing the signal propagation path according to the teachings of the present invention.

The methods of the present invention can be performed on various types of communication devices, including, for example, mobile telephones, messaging devices, personal digital assistants with communication capability, handheld radios, and notebook computers with communication capability. Such devices can include, for example, a processor operatively connected to a memory such as a random access memory (RAM), programmable read only memory (PROM), or a hybrid memory. The processor accesses a computer readable medium stored in the memory, which medium includes computer readable program code components configured to cause the device to execute the functions of the present invention.

Figure 8A:
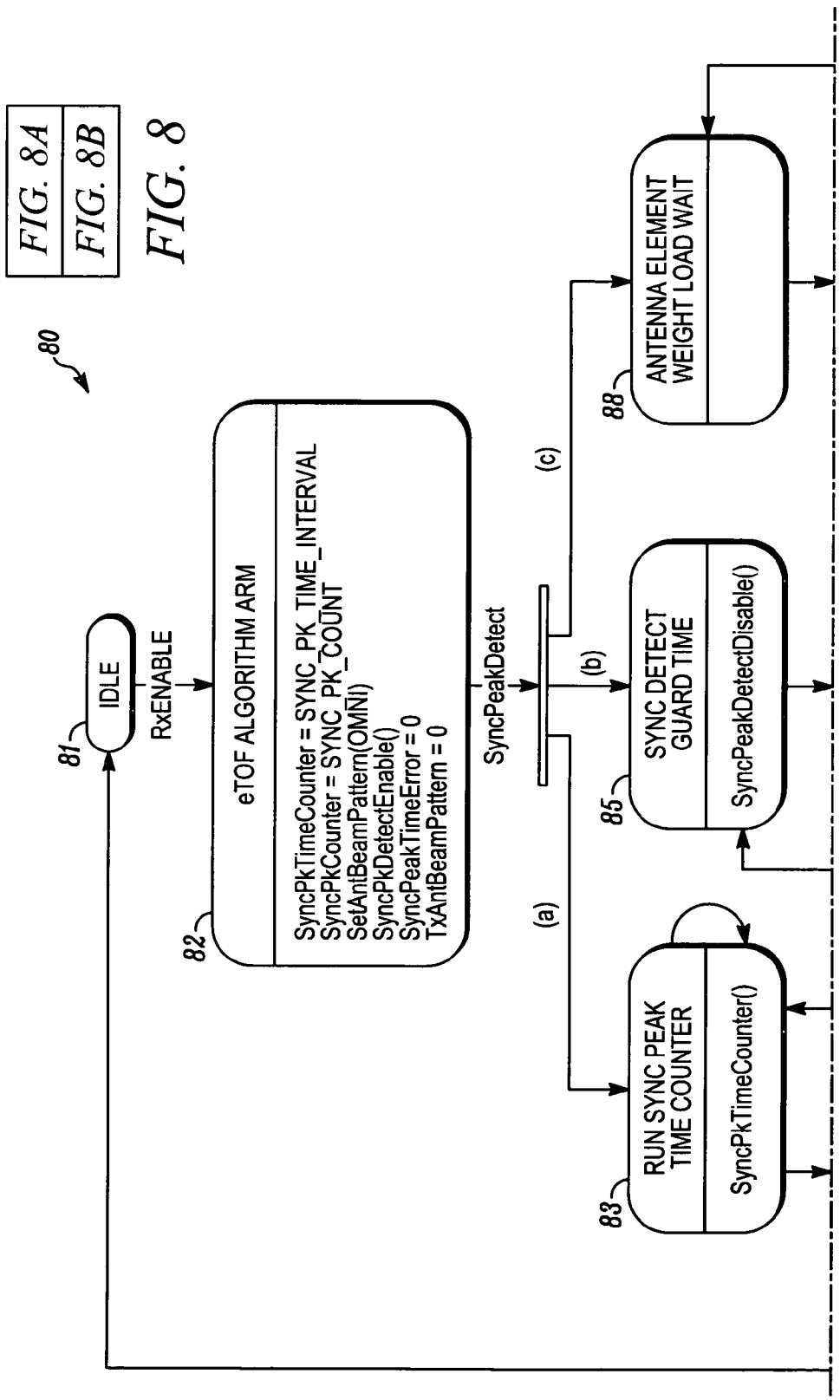
FIG. 8 is a state diagram illustrating a method of determining a minimum time of fight between a first communication device and a second communication device, according to an embodiment of the present invention.
Figure 8B:
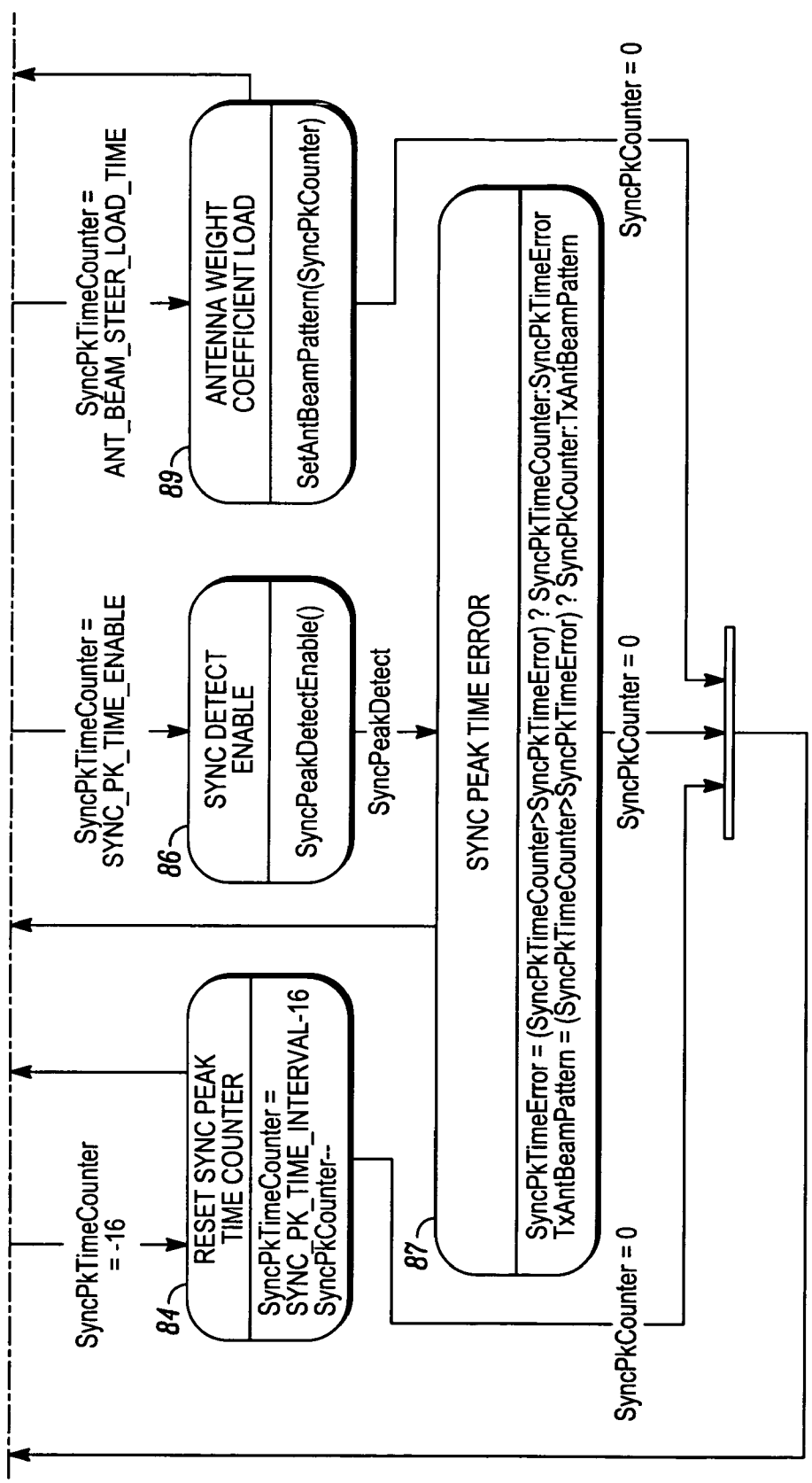

Referring to FIG. 8, a state diagram 80 illustrates a method of determining a minimum time of fight between a first communication device and a second communication device, according to an embodiment of the present invention. The algorithm commences in an idle state 81 waiting for a start signal. When an RxEnable event occurs, an arm state 82 is entered. In this state 82, both a synchronization peak time interval and synchronization peak counters are loaded with respective constant values. Also, an antenna system 60, 70 is set to have an omni directional reception pattern. Finally, a synchronization peak detector is enabled to arm a receiver for the first synchronization peak, and two resulting variables—SyncPkTimeError and TxAntBeamPattern—are initialized to zero.

Upon reception of the first synchronization peak, the method branches into three separate, parallel processes labeled (a), (b), and (c). The first process (a) decrements at state 83 the synchronization peak interval counter at a correlator clocking rate. Once this signed-integer counter reaches the negative of a re-load count (e.g., in FIG. 8 the reload count is shown as 16), the process (a) then transitions to a subsequent state 84 which decrements the synchronization peak counter and re-loads the interval counter with the constant peak count interval minus the re-load count value. The re-load count is a design constant and should be greater than the maximum expected synchronization peak time error. Upon repeating this loop for the number of expected synchronization peaks, the process (a) ends and waits for the other two processes (a) and (b) to complete.

The second process (b) shown in FIG. 8 times the occurrence of the embedded synchronization peaks relative to the first synchronization peak and stores the largest peak time error in correlator time units. Initially, at state 85 the process (b) prevents a receiver 11, 13 from detecting false early synchronization peaks arising from delayed paths of a present transmission by disabling the peak detector until just before the expected occurrence of the subsequent synchronization peak. The synchronization peak detector is re-enabled at state 86 once the interval counter reaches a SYNC_PK_TIME_ENABLE constant. That constant is a system parameter and should be set to a value which is greater than the expected synchronization time error. Once the peak detector is re-enabled and a synchronization peak occurs, the process (b) stores a snapshot of the synchronization peak interval counter. That frozen counter value now represents the number of time error units (p or r) between the present peak and the initial peak. If the number is negative, the present peak is later-in-time than the initial peak so it must be coming from a delayed path. Conversely, if the time error is positive, the present synchronization peak resulted from an earlier signal path. The synchronization peak time error value is then compared at state 87 to prior error values and saved in a SyncPkTimeError variable, if it is greater than prior error values. According to some embodiments of the present invention, the process (b) also stores the synchronization peak number of the peak with the highest error in a TxAntBeamPattern variable for use in beam-steering systems that employ an antenna system 70 that can direct electromagnetic waves in a particular direction. In such a system, the pinger 13 can direct its response transmission along a direction that is most likely to be the direct path back to the ranger 11. By directing the pinger's response, the probability of occurrence of in-direct, time-delayed paths at the ranger 11 is reduced, thus improving the overall TOF measurement precision. This process (b) ends once the peak counter reaches zero and waits for the other two processes (a) and (c) to complete.

The third, and final, process (c) spatially modulates the antenna beam pattern prior to the estimated start of each embedded synchronization sequence. This process (c) essentially monitors at state 88 the peak interval counter and configures at state 89 the antenna system 70 to a different pattern at the point in time that the interval counter has reached a count which represents the number of correlator time units of the entire synchronization sequence. For example, a Mesh Enabled Architecture (MEA) system's synchronization sequence is a stacked sequence composed of eight 128-chip Binary Phase Shift Keying (BPSK) DSSS symbols. Therefore, for an MEA system, an antenna pattern load count is set to a number greater than the product of 8×128=1024, as the correlator operates at the chip rate. This process (c) ends once the peak counter reaches zero and waits for the other two processes (a) and (b) to complete.

Once all three processes (a), (b), and (c) have completed, the system returns to the idle state 81. At this point, both the SyncPkTimeError and TxAntBeamPattern variables contain the TOA correction factor and synchronization peak number of the direct path, respectively. As described above, the TOA correction factor either can be used by the pinger to reduce its TAT or it can be sent back to the ranger 11 in a range reply for inclusion in a final TOF calculation. At the ranger 11, the TOA correction factor can be used directly to correct the RTT counter.

Figure 9:
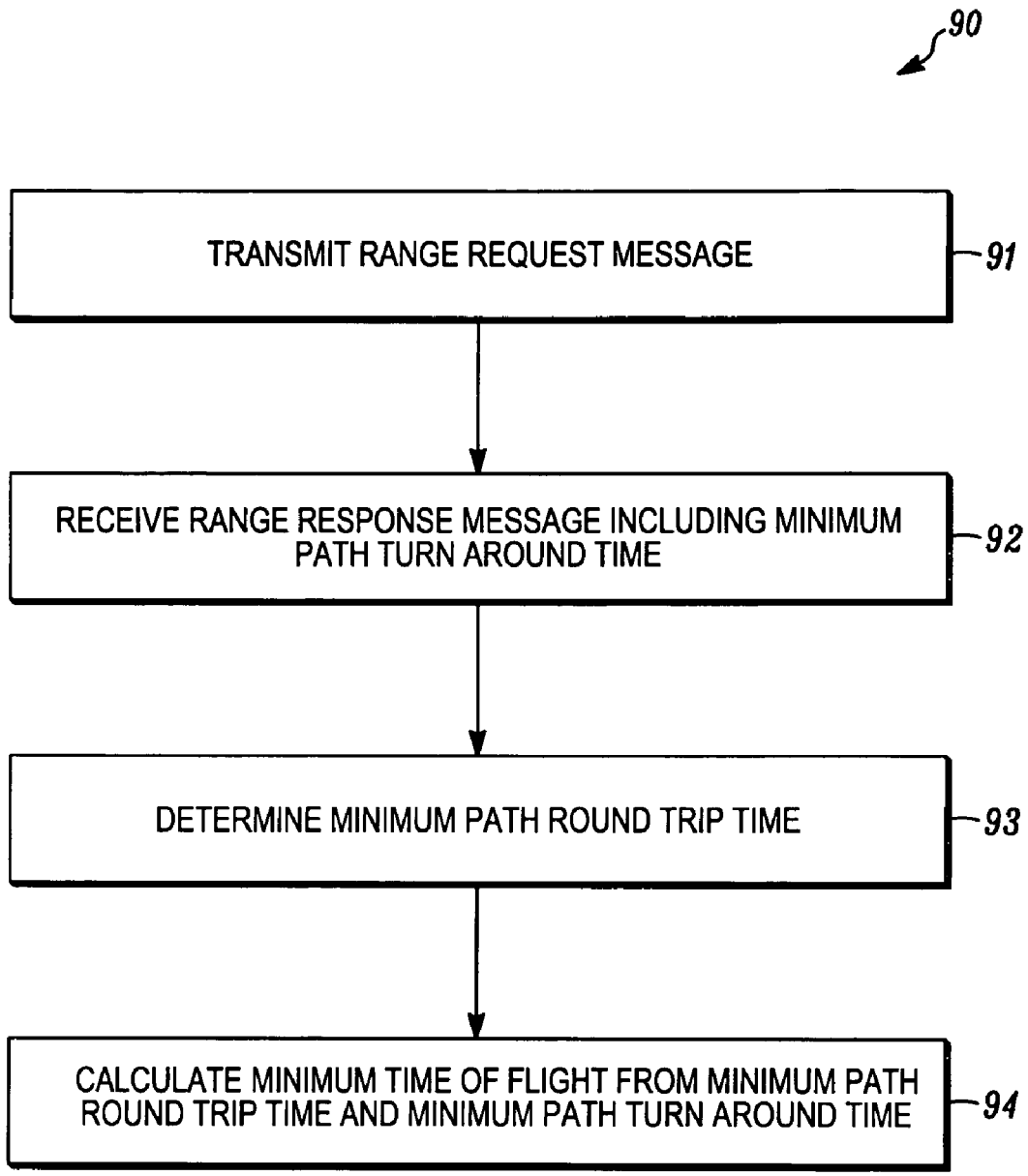
FIG. 9 is a generalized flow diagram illustrating a method of determining a minimum time of flight between a first communication device such as a ranger, and a second communication device such as a pinger, according to an embodiment of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring to FIG. 9, a generalized flow diagram illustrates a method 90 of determining a minimum time of flight between a first communication device such as the ranger 11, and a second communication device such as the pinger 13, according to an embodiment of the present invention. At step 91 a range request message is transmitted from the first communication device via a first RF channel to the second communication device. The range request message includes a first periodically repeating synchronization sequence. At step 92 a range response message is received at the first communication device via a second RF channel from the second communication device. Those skilled in the art will recognize that the first RF channel and the second RF channel are generally the same RF channel. The range response message includes a second periodically repeating synchronization sequence and a minimum path turn around time. A change in the second RF channel is induced after receipt of each synchronization sequence according to the teachings of the present invention. At step 93 a minimum path round trip time is determined from multiple time of arrival determinations. Finally, at step 94 the minimum time of flight is calculated from the minimum path round trip time and the minimum path turn around time.

The present invention thus has the advantage of correcting ranging errors induced by multi-path signals in round trip time range measurements between two nodes of a communication network, and therefore facilitates more accurate position locating of wireless communication devices. In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of determining a minimum time of flight of a radio frequency (RF) transmission between a first communication device and a second communication device, the method comprising:

transmitting from the first communication device via a first RF channel a range request message to the second communication device, wherein the range request message includes a first periodically repeating synchronization sequence;

receiving at the first communication device via a second RF channel a range response message from the second communication device, wherein the range response message includes a second periodically repeating synchronization sequence and a minimum path turn around time, wherein a change in the second RF channel is induced after receipt of each synchronization sequence;

determining a minimum path round trip time from multiple time of arrival determinations, wherein the minimum path turn around time is determined by:

detecting a first synchronization sequence of the first periodically repeating synchronization sequence;

detecting a later synchronization sequence of the first periodically repeating synchronization sequence;

determining a correction factor being a difference between a time of arrival of the later synchronization sequence and an expected time of arrival of the later synchronization sequence; and correcting a measured turn around time by the correction factor to obtain the minimum path turn around time; and calculating the minimum time of flight from the minimum path round trip time and the minimum path turn around time.

2. The method of claim 1 wherein the minimum path turn around time is in the form of a measured turn around time and a correction factor.

3. The method of claim 1 wherein the minimum path round trip time is in the form of a measured round trip time and a correction factor.

4. The method of claim 1, wherein the minimum path turn around time is determined at the second communication device.

5. The method of claim 1 wherein the minimum path round trip time is determined at the first communication device.

6. The method of claim 1 wherein the change in the second channel is induced by antenna switching.

7. The method of claim 1 wherein the change in the second channel is induced by antenna beam steering.

8. The method of claim 1 wherein the synchronization sequences are direct-sequence-spread-spectrum (DSSS) modulated signals.

9. The method of claim 1 wherein the first and second periodically repeating synchronization sequences are repeated throughout the range request message and range response message, respectively.

10. The method of claim 1 wherein the first and second periodically repeating synchronization sequences are repeated for a fixed number of repetitions.

11. The method of claim 1 wherein the first RF channel and the second RF channel are the same RF channel.

12. A method of determining a minimum time of flight of a radio frequency (RF) transmission between a first communication device and a second communication device, the method comprising:

calculating $T_{TOF}=\frac{1}{2}[(T_{RTT}-T_{TAT}-(r+p)T_c)]$ or $T_{TOF}=\frac{1}{2}[(T_{RTT}-rT_c)-(T_{TAT}-pT_c)]$, where $T_{TOF}$ is the estimated minimum time of flight, $T_{RTT}$ is a round trip time recorded at the first communication device, $T_{TAT}$ is a turn around time recorded at the second communication device, Tc is a correlation time step; r is a correction factor recorded at the first communication device; and p is a correction factor recorded at the second communication device; and wherein r and p are determined by:

detecting a first synchronization sequence of a periodically repeating synchronization sequence;

detecting a later synchronization sequence of the periodically repeating synchronization sequence; and counting correlation time steps between a time of arrival of the later synchronization sequence and an expected time of arrival of the later synchronization sequence, the number of time steps being determined as r at the first communication device and p at the second communication device.

13. The method of claim 12 further including the step of inducing a change in a channel between the first communication device and the second communication device after each synchronization sequence of the periodically repeating synchronization sequence.

14. The method of claim 13 wherein inducing a change in the channel occurs by antenna switching.

15. The method of claim 13 wherein inducing a change in the channel occurs by antenna beam steering.

16. The method of claim 12 wherein the synchronization sequence is a direct-sequence-spread-spectrum (DSSS) modulated signal.

17. A system for determining a minimum time of flight of a radio frequency (RF) transmission between a first communication device and a second communication device, the system comprising a computer useable medium having computer readable program code components configured to cause the system to:

transmit from the first communication device via a first RF channel a range request message to the second communication device, wherein the range request message includes a first periodically repeating synchronization sequence;

receive at the first communication device via a second RF channel a range response message from the second communication device, wherein the range response message includes a second periodically repeating synchronization sequence and a minimum path turn around time, and a change in the second RF channel is induced after receipt of each synchronization sequence;

determine a minimum path round trip time from multiple time of arrival determinations, wherein the minimum path turn around time is determined by:

detecting a first synchronization sequence of the first periodically repeating synchronization sequence;

detecting a later synchronization sequence of the first periodically repeating synchronization sequence;

determining a correction factor being a difference between a time of arrival of the later synchronization sequence and an expected time of arrival of the later synchronization sequence; and correcting a measured turn around time by the correction factor to obtain the minimum path turn around time; and calculate the minimum time of flight from the minimum path round trip time and the minimum path turn around time.

18. The system of claim 17 wherein the minimum path turn around time is in the form of a measured turn around time and a correction factor.

19. The system of claim 17 wherein the minimum path round trip time is in the form of a measured round trip time and a correction factor.

20. The system of claim 17 wherein the change in the second RF channel is induced by antenna switching.

21. The system of claim 17 wherein the change in the second RF channel is induced by antenna beam steering.

22. The system of claim 17 wherein the synchronization sequences are direct-sequence-spread-spectrum (DSSS) modulated signals.

23. The system of claim 17 wherein the first and second periodically repeating synchronization sequences are repeated throughout the range request message and range response message, respectively.

24. The system of claim 17 wherein the first and second periodically repeating synchronization sequences are repeated for a fixed number of repetitions.

25. The system of claim 17 wherein the first RF channel and the second RF channel are the same RF channel.

* * * * *